United States Patent
Park et al.

(10) Patent No.: US 7,835,235 B2
(45) Date of Patent: Nov. 16, 2010

(54) OPTICAL PICKUP APPARATUS AND OPTICAL RECORDING/REPRODUCING SYSTEM USING THE SAME

(75) Inventors: Sun-mook Park, Hwaseong-si (KR); Ui-yol Kim, Suwon-si (KR); Jong-kook Lee, Seoul (KR); Pyong-yong Seong, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 599 days.

(21) Appl. No.: 11/808,517

(22) Filed: Jun. 11, 2007

(65) Prior Publication Data

US 2008/0037387 A1    Feb. 14, 2008

(30) Foreign Application Priority Data

Aug. 9, 2006   (KR) .................. 10-2006-0075305

(51) Int. Cl.
*G11B 7/00* (2006.01)
(52) U.S. Cl. .............. 369/44.23; 369/44.21; 369/44.37; 369/110.03; 369/112.05; 369/112.06; 369/112.07; 369/112.24; 369/112.26
(58) Field of Classification Search ........................ None
See application file for complete search history.

(56) References Cited

U.S. PATENT DOCUMENTS

2006/0193219 A1*  8/2006  Kawamura et al. ....... 369/44.37
2008/0037387 A1*  2/2008  Park et al. ................ 369/44.23
2008/0253263 A1*  10/2008  Komma .................. 369/112.05

FOREIGN PATENT DOCUMENTS

| JP | 09-073639 | 3/1997 |
| JP | 2001-155378 | 6/2001 |
| JP | 2002-329338 | 11/2002 |
| KR | 10-2003-0024159 | 3/2003 |
| KR | 10-2005-0088837 | 9/2005 |

* cited by examiner

*Primary Examiner*—Joseph H Feild
*Assistant Examiner*—Ifedayo Iluyomade
(74) *Attorney, Agent, or Firm*—NSIP Law

(57) ABSTRACT

An optical pickup apparatus and an optical recording/reproducing system including the same, the optical pickup apparatus includes at least two optical systems for different types of optical recording media, one of objective lenses of the optical systems being offset from a central line of the optical recording medium, wherein the optical system including the offset objective lens having a diffraction grating diffracting light emitted from a light source to form a main beam and sub-beams, wherein the diffraction grating includes first and second diffraction regions having different grating patterns arranged alternately thereon, and a center of each sub-beam is arranged at a boundary of the first and second diffraction regions of the diffraction grating, and a center of the diffraction grating and an optical axis of the light source are adjusted to be coincided with each other, preventing generation of an alternating current in a Push-Pull signal of the sub-beams.

20 Claims, 8 Drawing Sheets

OPTICAL PICKUP APPARATUS AND OPTICAL RECORDING/REPRODUCING SYSTEM USING THE SAME

CROSS-REFERENCE TO RELATED APPLICATIONS

This application claims the benefit of Korean Patent Application No. 10-2006-0075305, filed on Aug. 9, 2006, in the Korean Intellectual Property Office, the disclosure of which is incorporated herein in its entirety by reference.

BACKGROUND

1. Field

The present invention relates to an optical pickup apparatus and an optical recording/reproducing system employing the same.

2. Description of the Related Art

As the industry develops, the amount of data to be processed and recorded increases, and an optical recording medium and optical recording/reproducing system having higher recording density are required. According to such requirement, optical recording/reproducing systems, for example, the Blu-ray Disc (BD) system and HD-DVD system have been suggested. However, these systems need to be compatible with an existing system such as CD or DVD. In particular, since light having a wavelength of 405 nm which is significantly shorter than conventional system is used in the BD system, an objective lens having a higher numerical aperture (NA) is required. Therefore, in order for all CD/DVD/HD-DVD/BD systems to be compatible, an optical pickup apparatus of the optical recording/reproducing system includes two objective lenses. In other words, an objective lens for a CD/DVD/HD-DVD system and an additional objective lens for a BD system is included in the optical pickup apparatus.

The method of using two objective lenses in one optical pickup apparatus includes preparing an additional actuator for each objective lens, and mounting all two objective lenses in one actuator. In addition, when mounting all two objective lenses in one actuator, two objective lenses may be arranged in a radial direction or in a tangential direction of a corresponding optical disc. When two objective lenses are arranged in a tangential direction of the optical disc due to a various structural reasons, one of two objective lenses falls off from the center line of the optical disc, which intersects the center of the optical disc, to the tangential direction, that is, offset of the lens occurs.

Figure 1A:
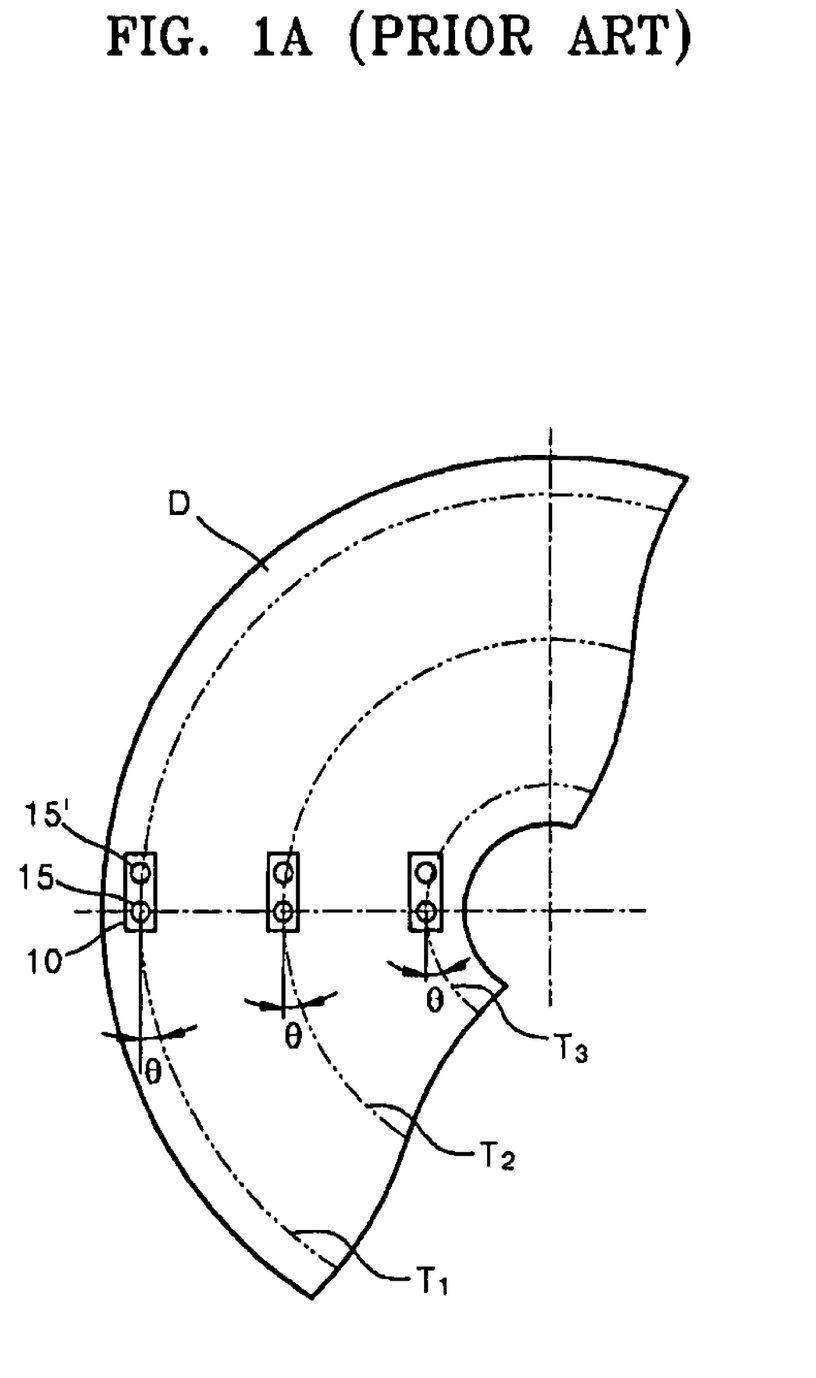
FIG. 1A is a diagram of a conventional optical pickup apparatus including an optical system having two objective lenses illustrating tracking with a first objective lens of optical system.
Figure 1B:
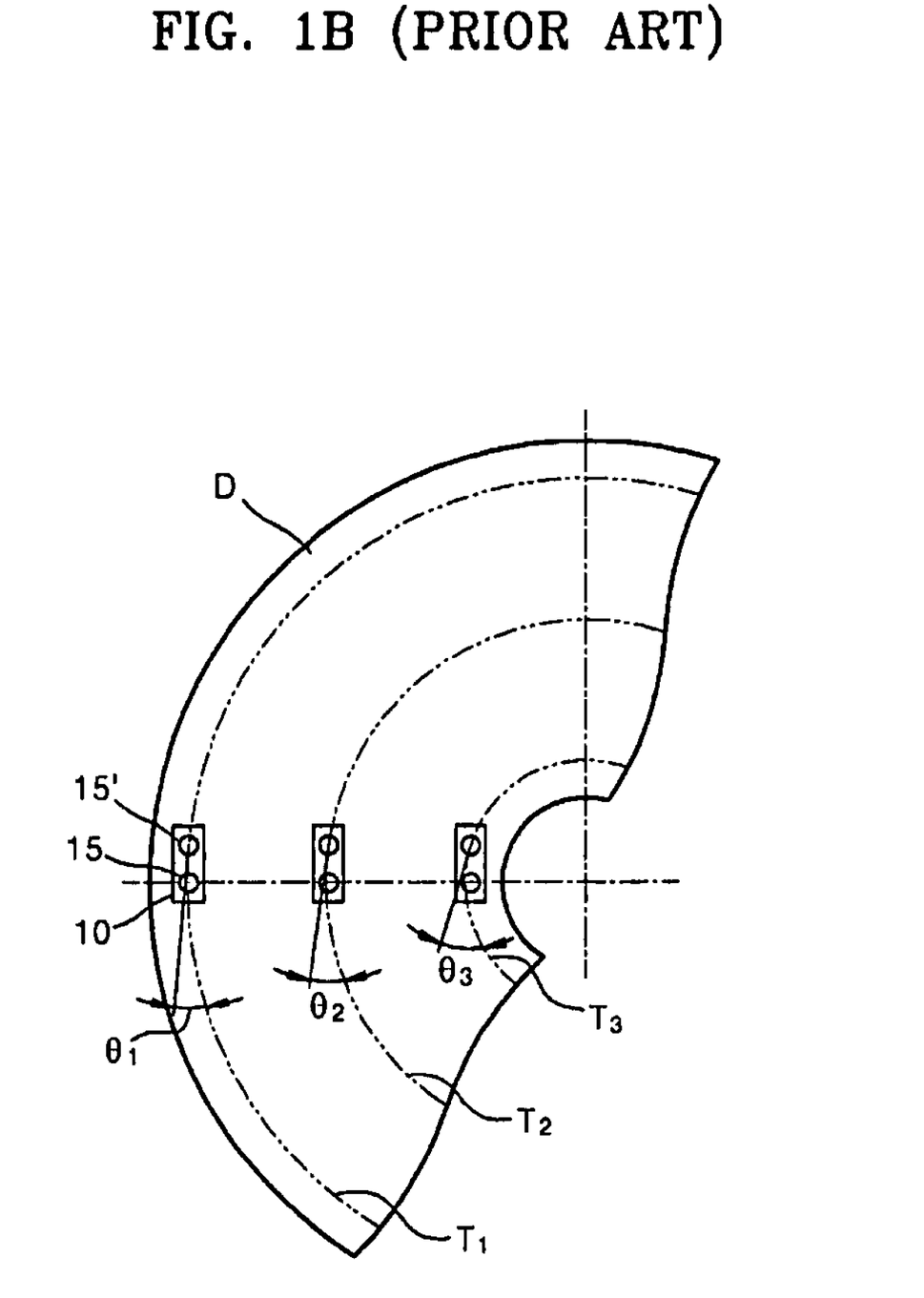
FIG. 1B is a diagram of a conventional optical pickup apparatus including an optical system having two objective lenses illustrating tracking with a second objective lens of optical system.

For example, as shown in FIGS. 1A and 1B, it is assumed that a first objective lens 15 disposed in the left side of an actuator 10 is arranged on the center line of a disk D. In FIG. 1A, although the first objective lens 15 moves along a radial direction of the disk D and tracks $T_1$, $T_2$, and $T_3$ at any position, angles with respect to each track are not changed. However, since a second objective lens 15' disposed in the right side of the actuator 10 is not arranged on an axis that passes through the center of the disk D, as shown in FIG. 1B, directions of tracks $T_1$, $T_2$, and $T_3$ are changed according to the position of the second objective lens 15' determined based on a radial direction of the disk D. Consequently, with respect to optical system combined with the second objective lens 15', wherein the second objective lens 15' is disposed in the right side of the actuator 10, accurate tracking error signals cannot be obtained using a conventional Differential Push-Pull (DPP) method.

Therefore, a conventional method of forming two or more sub beams on the tracks or shifting phases of all or a part of the sub beams by providing a specially shaped diffraction grating or a hologram optical element (HOE) to the optical system having the objective lens which is offset from the central line of the disk is used so that theoretically only a direct current (DC) exists in a sub push-pull signal. In addition, in order to reduce an effect due to a change of a track direction in the inner/outer circumference of discs, a direction of the diffraction grating is adjusted based on the center track $T_2$, and the rest of the configuration of the optical system is made as if there is no offset of the lens.

Figure 2:
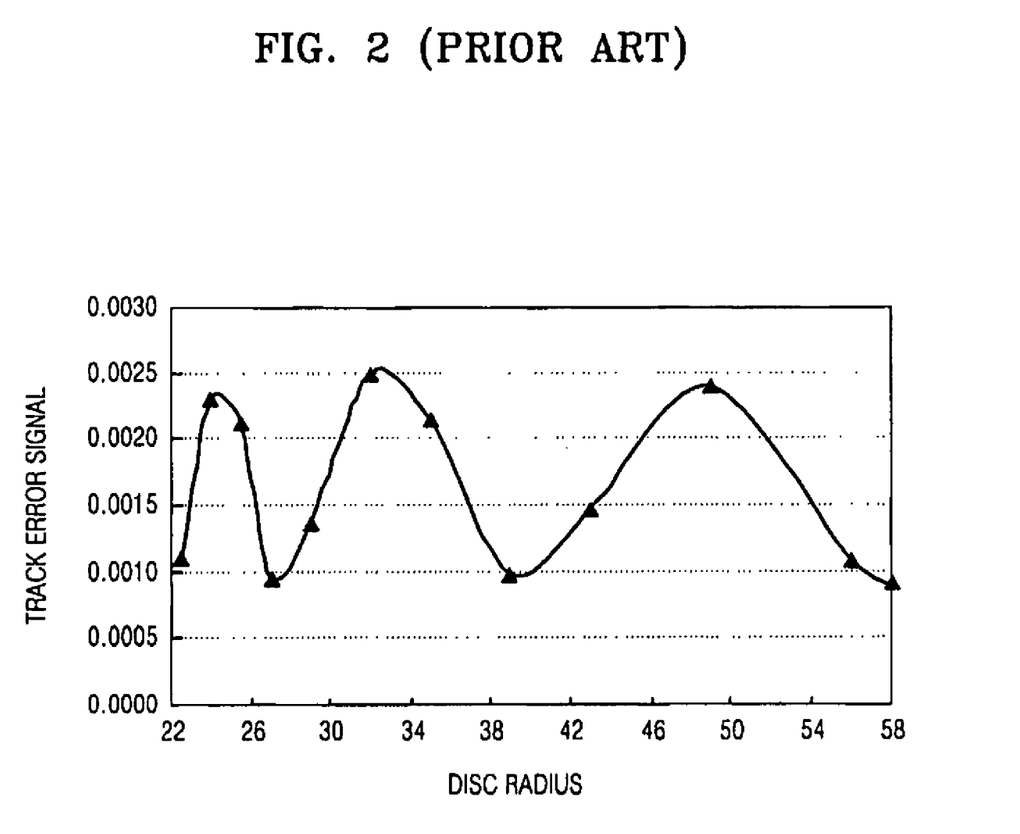
FIG. 2 is a graph showing changes according to disc radius with respect to track error signals generated from the second objective lens of optical system in the conventional optical pickup apparatus including an optical system having two objective lenses of FIGS. 1A and 1B.

However, in the conventional method, while the diffraction grating is rotated, an optical axis of a light source and an axis of the diffraction grating do not coincide, and thus, a difference in the amount of light is generated between sub-beams separated from the diffraction grating. Subsequently, an alternating current (AC) is substantially generated in sub push-pull (SPP) signals. In addition, when an optical axis of a light source and an axis of the diffraction grating coincide with each other, the centers of the sub-beams do not coincide with the boundary of the diffraction grating, and thus, an AC is generated in the SPP signal for each of two sub-beams. Moreover, in the conventional optical system, light emitted from the light source and incident on a track of the disk is only considered to control a direction of diffraction grating. Consequently, for light reflected from the disk track and incident on the photodetector, an angle of incidence may still be inaccurate. In other words, the main beam and a number of sub-beams are controlled to be accurately arranged along the track at the center of the disk, however, angles between the main beam and the sub-beams reflected from the track and photodetectors used to detect such beams may still be off. Accordingly, an AC is generated in the SPP signal, and phases of the SPP signal and a Main Push-Pull (MPP) signal are changed according to the radial position of the objective lens disposed on the disk. As a result, a tracking error signal is changed according to a radius of the disk as shown in FIG. 2. Since the tracking error signal is changed according to a radius of the disk, accurate servo-control of the optical pickup apparatus is difficult.

SUMMARY

Accordingly, an aspect of the present invention is to provide an optical pickup apparatus including an optical system having two objective lenses disposed in a tangential direction of a disc which accurately performs a servo-control, even when one of the objective lenses are offset.

Additional aspects and/or advantages will be set forth in part in the description which follows and, in part, will be apparent from the description, or may be learned by practice of the invention.

The foregoing and/or other aspects of the present invention are achieved by providing an optical pickup apparatus including at least two optical systems for different types of optical recording media, one of objective lenses of the optical systems being offset from a central line of the optical recording medium, wherein the optical system including the offset objective lens includes a diffraction grating diffracting light emitted from a light source to form a main beam and a number of sub-beams, wherein the diffraction grating includes first and second diffraction regions having different grating patterns arranged alternately thereon, and a center of each sub-beam is arranged at the boundary of the first and second diffraction regions on the surface of the diffraction grating, and wherein a center of the diffraction grating and an optical axis of the light source are adjusted to be coincided with each other, thereby preventing a generation of an alternating current (AC) in a Push-Pull signal of the sub-beams.

According to an aspect of the present invention, the diffraction grating is rotated for the main beam and the sub-beams formed by the diffraction grating to be arranged along a track direction of the optical recording medium.

According to an aspect of the present invention, a rotational angle of the diffraction grating is determined based on a direction of a track positioned at a middle of the optical recording medium in a radial direction.

According to an aspect of the present invention, the optical pickup apparatus further includes a photodetector unit and an astigmatic lens in the optical system including the offset objective lens, both rotated corresponding to a track of the optical recording medium, wherein the photodetector unit measures the amounts of light of the main beam and the sub-beams reflected from the optical recording medium and the astigmatic lens introduces astigmatism into the main beam and the sub-beams incident onto the photodetector unit.

According to an aspect of the present invention, rotational angles of the astigmatic lens and the photodetector unit are determined based on a track position at the middle of the optical recording medium in the radial direction.

According to an aspect of the present invention, the areas of the first and second diffraction regions for each sub-beam are the same on the surface of the diffraction grating.

According to an aspect of the present invention, the grating patterns of the first and second diffraction regions may be inclined in opposite directions.

It is another aspect of the present invention to provide an optical recording/reproducing system including the optical pickup apparatus described above so as to make tracking servo possible for different types of optical recording media.

It is another aspect of the present invention to provide a method of preventing a generation of an AC in a Push-Pull signal of sub-beams in an optical pickup apparatus, wherein the optical pickup apparatus includes at least two optical systems for different types of optical recording media, one of objective lenses in the optical systems being offset from a central line of the optical recording medium, the method including disposing a diffraction grating diffracting light emitted from a light source to form a main beam and a number of sub-beams in the optical system including the offset objective lens, the diffraction grating comprising first and second diffraction regions having different grating patterns arranged alternately on the diffraction grating; and positioning a center of each of the sub-beams at a boundary of the first and second diffraction regions on the surface of the diffraction grating.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 3:
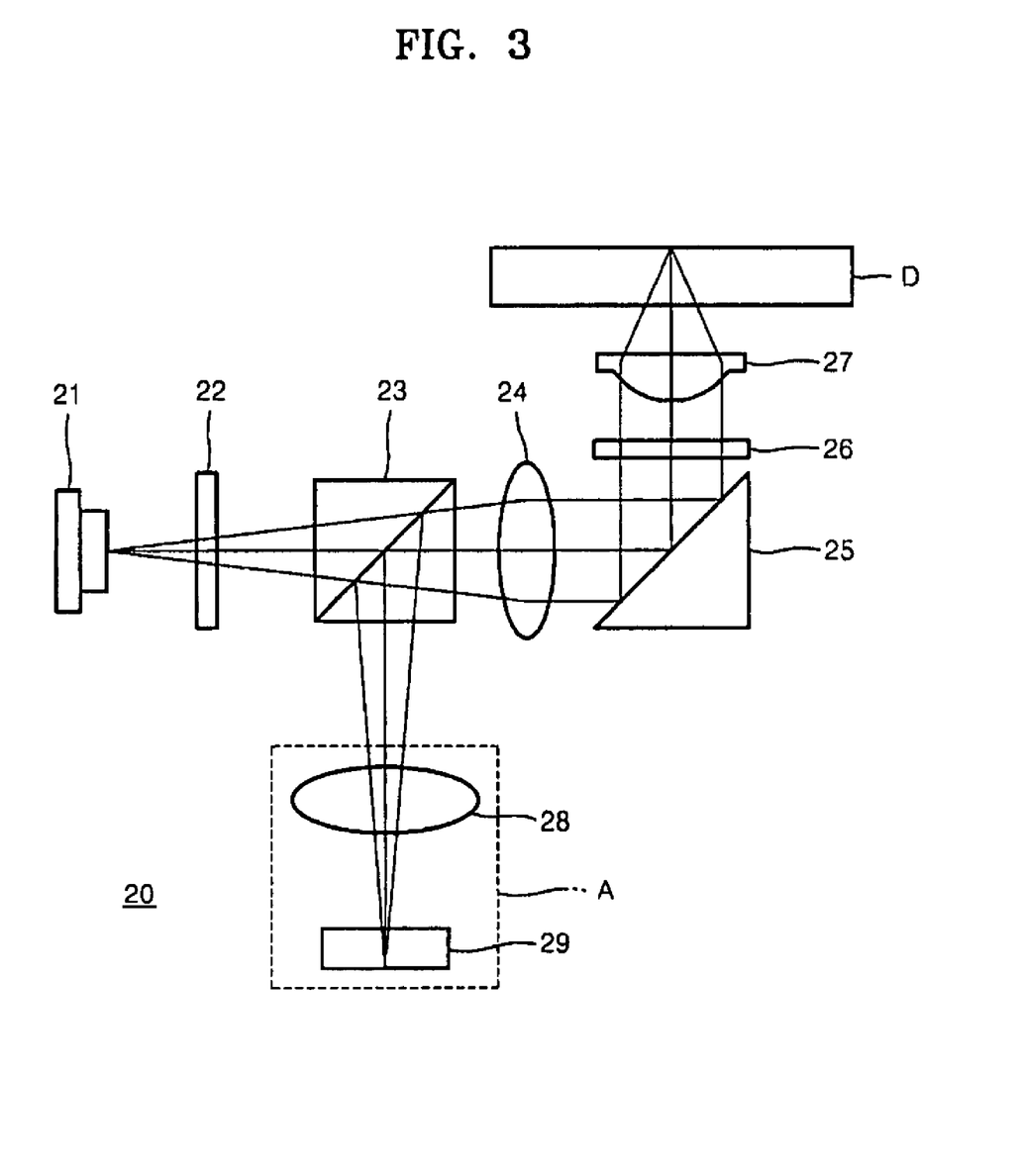
FIG. 3 is a diagram schematically illustrating an optical system having an objective lens used in an optical pickup apparatus according to an embodiment of the present invention.

FIG. 3 is a diagram schematically illustrating an optical system 20 having an objective lens used in a general optical pickup apparatus according to an embodiment of the present invention. As shown in FIG. 3, the optical system 20 comprises a light source 21, a diffraction grating 22, a polarization beam splitter 23, a collimating lens 24, a reflective mirror 25, a ¼ wave plate 26, an objective lens 27, an astigmatic lens 28, and a photodetector unit 29.

Here, according to an embodiment of the present invention, the light source 21 is an infrared laser light source having a wavelength of approximately 780 nm, red laser light source having a wavelength of approximately 650 nm, or a blue laser light source having a wavelength of approximately 405 nm when used for CD, DVD, and BD, respectively. However, the light source 21 of the present invention is not limited hereto and may vary as necessary.

The diffraction grating 22 comprises a fine grating pattern formed on the surface thereof and diffracts light emitted from the light source 21 to form a zero-order diffracted main beam and ±1st or more order diffracted sub-beams, the sub-beams having smaller amount of light than the main beam. The polarization beam splitter 23 allows light to pass through or to reflect depending on a polarization direction of the incident light. The collimating lens 24 collimates light, progressing from the light source 21. The reflective mirror 25 bends a progressive direction of light from the light source 21 in order for the light to be incident on a disk D through the objective lens 27. The ¼ wave plate 26 changes a polarization direction of the light reflected from the disk D after incident on the disk D. The objective lens 27 focuses the main beam and the sub-beam to form a main spot and sub spot on the track of the disk D. The astigmatic lens 28 introduces astigmatism of approximately 45° direction into light reflected by the polarization beam splitter 23 toward the photodetector unit 29. The photodetector unit 29 comprises a number of photodetectors to measure a respective amount of light of the main beam and the sub-beam which is reflected from the disk D. For example, each photodetector of the photodetector unit 29 is a quad-detector. However, the present invention is not limited hereto, therefore, the photodetector unit 29 may be other photodetectors such as six divided or eight divided photodetector, for example.

In an optical pickup apparatus in which all CD, DVD, HD-DVD, and BD are compatible, two optical systems having the above structure are installed respectively for CD/DVD/HD-DVD and BD. In this case, two objective lenses 27 can be installed in one actuator. However, when two objective lenses 27 are installed in a tangential direction of the disk D, problems described above may arise. In order to solve these problems, in the optical system comprising objective lenses 27 which are not arranged at the center line of the disk D, the diffraction grating 22 is simply rotated in the conventional optical pickup apparatus. However, while the diffraction grating 22 was rotated, an additional process to make the optical axis of the light source and the axis of diffraction grating 22 coincide was not performed, and thus, a difference in the amount of light generated among the sub-beams separated from the diffraction grating 22 occurs.

Figure 4:
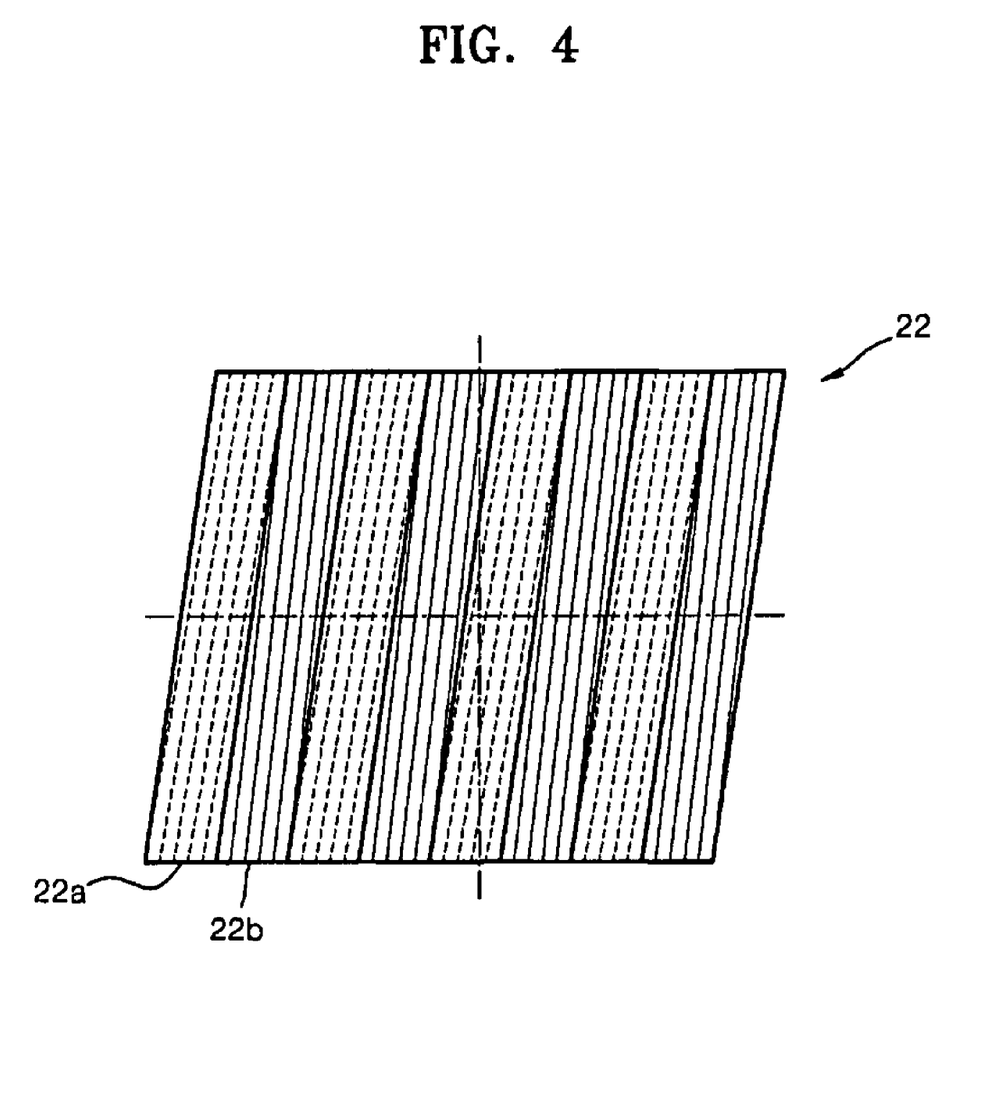
FIG. 4 is a diagram of a diffraction grating according to an embodiment of the present invention.

FIG. 4 is a diagram of the diffraction grating 22 according to an embodiment of the present invention. In FIG. 4, in the diffraction grating 22, two diffraction regions 22A and 22B having grating patterns inclined in an opposite direction to each other are alternately arranged in parallel. As shown in FIG. 4, the two diffraction regions 22A and 22B are also inclined at a predetermined angle. The inclined angle of the diffraction regions 22A and 22B can be determined to correspond with a track direction, for example, at a center track $T_2$. According to an embodiment of the present invention, a width of the diffraction regions 22A and 22B, a pitch of the grating patterns in the diffraction regions 22A and 22B, and a number of the grating patterns are determined so that the amount of light of the sub-beams are same when the centers of the light source 21 and the diffraction grating 22 are arranged to coincide with each other. For example, according to an embodiment of the present invention, when a blue laser diode having a wavelength of 405 nm is used as the light source 21, the pitch of the grating patterns in the diffraction regions 22A and 22B is approximately 18 μm and the number of the grating patterns is approximately 6. However, the present invention is not limited hereto and may vary, as necessary.

Figure 5A:
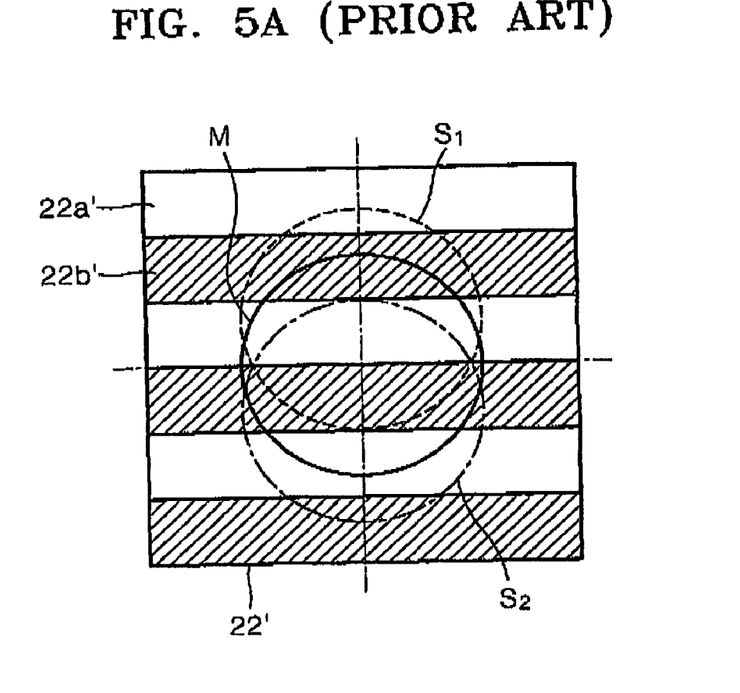
FIG. 5A is a diagram illustrating positions of main beam and sub-beam generated from a conventional diffraction grating.
Figure 5B:
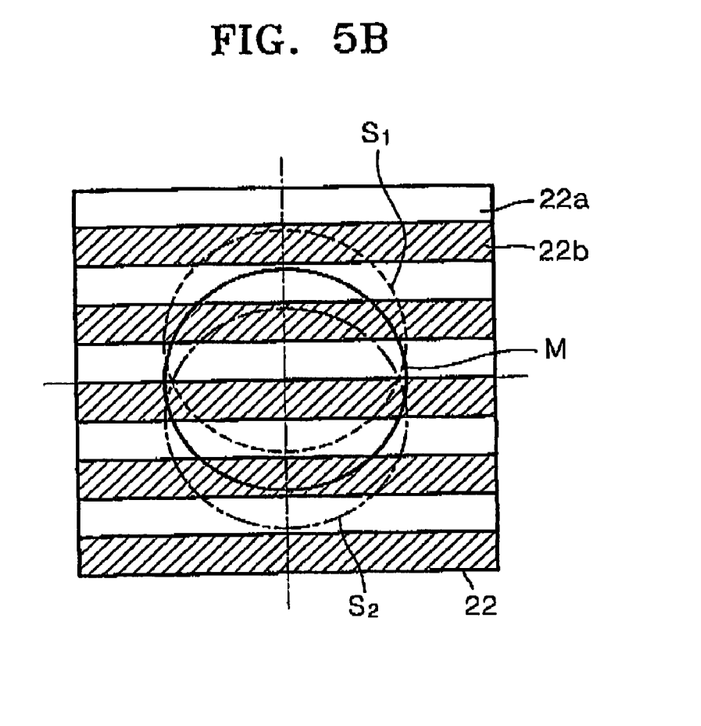
FIG. 5B is a diagram illustrating positions of main beam and sub-beam generated from the diffraction grating according to an embodiment of the present invention.

FIG. 5A is a diagram illustrating positions of a main beam and a sub-beam generated from a conventional diffraction grating 22' and FIG. 5B is a diagram illustrating positions of main beam and sub-beam generated from the diffraction grating 22 according to an embodiment of the present invention. FIGS. 5A and 5B are illustrated to explain the principle that the amount of light of the sub-beams becomes the same by the diffraction grating 22 according to an embodiment of the present invention. The diffraction regions in FIGS. 5A and 5B are horizontal for convenience but are substantially inclined along a track direction.

As shown in FIG. 5A, position relation between a main beam M, sub-beams S1 and S2, both generating from the conventional diffraction grating 22', and diffraction regions 22A' and 22B' are illustrated. Although the center of the main beam coincides with a boundary of the diffraction regions 22A' and 22B' in the diffraction grating 22', the center of the first sub-beam S1 and the center of the second sub-beam S2 are disposed in relative positions in different diffraction regions of each other on the diffraction grating 22'. Accordingly, the area A of the first diffraction region 22A' in the first sub-beam S1 and the area B of the second diffraction region 22B' in the first sub-beam S1 are different from each other and the area A of the first diffraction region 22A' in the second sub-beam S2 and the area B of the second diffraction region 22B' in the second sub-beam S2 are different from each other. Subsequently, the amounts of light of the two sub-beams S1 and S2 are different from each other. Therefore, an AC is generated in each sub push-pull signal for the first sub-beam S1 and the second sub-beam S2, and thus, an AC is generated in the whole SPP signal. If the main beam M in FIG. 5A does not coincide with the boundary of the diffraction regions 22A' and 22B' of the diffraction grating 22', the area A of the first diffraction region 22A' in the first sub-beam S1 and the second sub-beam S2 cannot be the same as the area B of the second diffraction region 22B' in the first sub-beam S1 and the second sub-beam S2, and thus, an AC is generated in the SPP signal.

As shown in FIG. 5B, the center of the first sub-beam S1 and the center of the second sub-beam S2 are both disposed at the boundary of a diffraction region 22A and a second diffraction region 22B on the surface of the diffraction grating 22 according to an embodiment of the present invention. Therefore, the area A of the first diffraction region 22A and the area B of the second diffraction region 22B in the first sub-beam S1 are same and the area A of the first diffraction region 22A and the area B of the second diffraction region 22B in the second sub-beam S2 are same. Therefore, when the center of the diffraction grating 22 according to an embodiment of the present invention accurately coincides with the optical axis of the light source 21, the areas A and B of the first and second diffraction regions 22A and 22B in the first and second sub-beams S1 and S2 divided by the diffraction grating 22 are exactly same as each other. Consequently, the amounts of light of the two sub-beams S1 and S2 are the same.

According to the principle described above, when the center of the diffraction grating 22 and the optical axis of the light source 21 are arranged to accurately coincide with each other, an AC in the SPP signal can be reduced by rotating the diffraction grating 22 and then accurately arranging the main beam and the sub-beams along a track direction. Accordingly, since a direction of the track is changed according to a radial direction of the disk D, a rotational angle of the diffraction grating 22 may be determined corresponding to a track direction at the center track $T_2$ of the disk D in order to minimize an error.

Figure 6A:
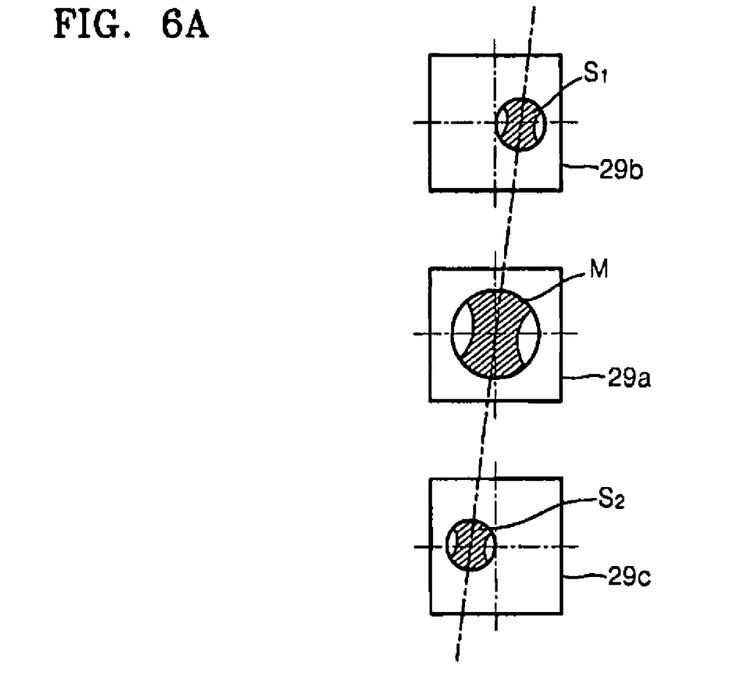
FIG. 6A is a diagram illustrating positions of main beam and sub-beam in which light is accepted to four partitioned light detectors in the conventional optical pickup apparatus.

On the other hand, in the conventional optical system in which the objective lens is not arranged on the center line of the disk D described above, light emitted from the light source 21 which is incident on the disk D is only considered. That is, light reflected from the disk D and incident on the photodetector unit 29 is not considered. Therefore, as illustrated in FIG. 6A, the main beam M and the sub-beams S1 and S2 which are received by three quad-photodetectors 29a, 29b, and 29c are inclined as much as a direction of the track at which the objective lens 27 is positioned. Consequently, a baseball pattern of each beam, an astigmatism direction, and division angles of the photodetectors 29a, 29b, and 29c are off each other and thus it is hard to accurately determine a tracking error signal.

Figure 6B:
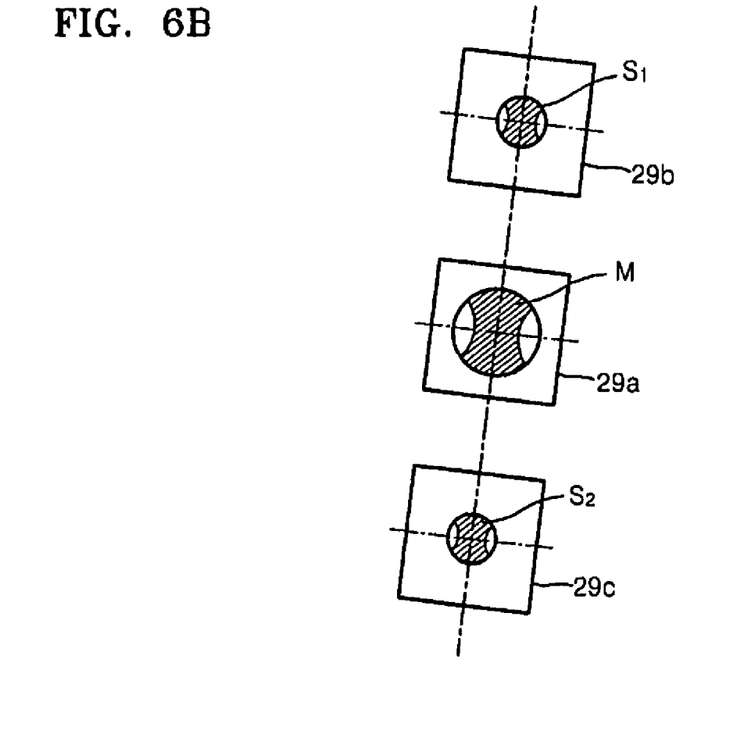
FIG. 6B is a diagram illustrating positions of main beam and sub-beam in which light is accepted to four partitioned photodetectors in the optical pickup apparatus according to an embodiment of the present invention.

In order to improve such problems, both an astigmatic lens 28 and a photodetector unit 29 which are indicated by a box A in FIG. 3, are rotated at a predetermined angle so that the quad-photodetectors 29a, 29b, and 29c and beams received by the quad-photodetectors 29a, 29b, and 29c coincide with each other. Here, rotation of the astigmatic lens 28 is to introduce a 45° astigmatism into baseball pattern of the main beam M and the sub-beams S1 and S2 generated from the disk D. Here, the direction of the tracks varies according to the position of the objective lens 27 based on the radial direction of the disk D as described above. Therefore, in order to minimize an error, the astigmatic lens 28 and the photodetector unit 29 are rotated based on the center track $T_2$ of the disk D.

Figure 7:
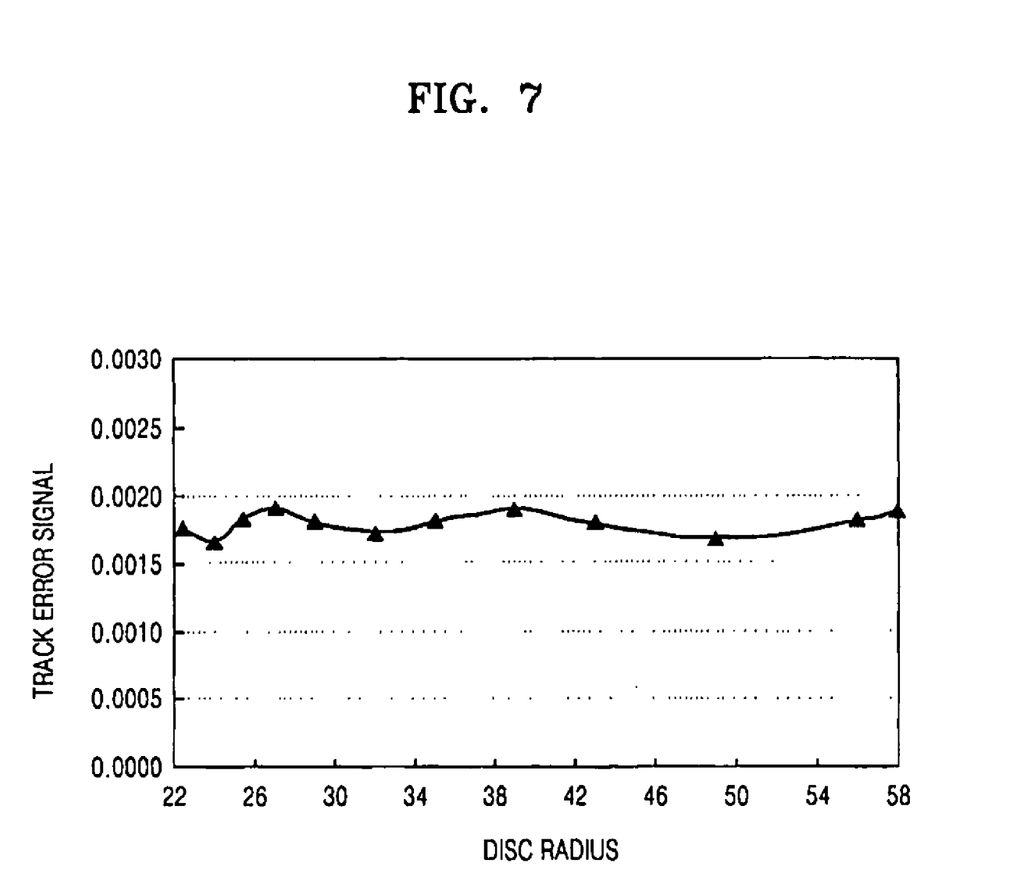
FIG. 7 is a graph showing changes according to disc radius with respect to track error signals generated from the second objective lens of optical system in the optical pickup apparatus according to an embodiment of the present invention.

Consequently, SPP signals not having an AC can be obtained. Then, as illustrated in FIG. 7, a tracking error signal without deviation according to a radial direction can be obtained. For example, in the conventional optical pickup apparatus, the deviation of the tracking error signal according to a radial direction is approximately 40% as illustrated in FIG. 2. However, in the present invention, the deviation of the tracking error signal according to a radial direction is approximately 5% as illustrated in FIG. 7.

As described above, in the optical recording/reproducing system according to the present invention which is compatible with respect to an optical recording medium having various kinds such as CD/DVD/BD/HD-DVD, even two objective lenses can be installed along a tangential direction in one actuator, and accurate tracking error signals can be obtained using either two optical systems. Therefore, accurate tracking servo is possible for various kinds of optical recording medium.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An optical pickup apparatus comprising at least two optical systems for different types of optical recording media, one of objective lenses of the optical systems being offset from a central line of the optical recording medium,
   wherein the optical system including the offset objective lens comprises a diffraction grating diffracting light emitted from a light source to form a main beam and a number of sub-beams,
   wherein the diffraction grating comprises first and second diffraction regions having different grating patterns arranged alternately thereon, and a center of each sub-beam is arranged at a boundary of the first and second diffraction regions on the surface of the diffraction grating, and wherein a center of the diffraction grating and an optical axis of the light source are adjusted to be coincided with each other.

2. The optical pickup apparatus of claim 1, wherein the diffraction grating is rotated for the main beam and the sub-beams formed by the diffraction grating to be arranged along a track direction of the optical recording medium.

3. The optical pickup apparatus of claim 2, wherein a rotational angle of the diffraction grating is determined based on a direction of a track positioned at a middle of the optical recording medium in a radial direction.

4. The optical pickup apparatus of claim 2, further comprising:
   a photodetector unit and an astigmatic lens in the optical system including the offset objective lens, both rotated corresponding to a track of the optical recording medium, wherein the photodetector unit measures amounts of light of the main beam and the sub-beams reflected from the optical recording medium and the astigmatic lens introduces astigmatism into the main beam and the sub-beams incident onto the photodetector unit.

5. The optical pickup apparatus of claim 4, wherein rotational angles of the astigmatic lens and the photodetector unit are determined based on a track position at a middle of the optical recording medium in the radial direction.

6. The optical pickup apparatus of claim 1, wherein areas of the first and second diffraction regions for each sub-beam are the same on the surface of the diffraction grating.

7. The optical pickup apparatus of claim 6, wherein the grating patterns of the first and second diffraction regions are inclined in opposite directions.

8. The optical pickup apparatus of claim 7, wherein the first and second diffraction regions having grating patterns inclined in an opposite direction to each other are alternately arranged in parallel.

9. The optical pickup apparatus of claim 7, wherein an inclined angle of the first and second diffraction regions are determined to correspond with a track direction.

10. The optical pickup apparatus of claim 7, wherein a width of the first and second diffraction regions, a pitch of the grating patterns in the first and second diffraction regions, and a number of the grating patterns are determined such that an amount of light of the sub-beams are the same when centers of the light source and the diffraction grating are arranged to coincide with each other.

11. An optical recording/reproducing system comprising:
   an optical pickup apparatus comprising at least two optical systems for different types of optical recording media, one of objective lenses of the optical systems being offset from a central line of the optical recording medium,
   wherein the optical system including the offset objective lens comprises a diffraction grating diffracting light emitted from a light source to form a main beam and a number of sub-beams,
   wherein the diffraction grating comprises first and second diffraction regions having different grating patterns arranged alternately thereon, and a center of each sub-beam is arranged at the boundary of the first and second diffraction regions on the surface of the diffraction grating, and wherein a center of the diffraction grating and an optical axis of the light source are adjusted to be coincided with each other.

12. A method of preventing a generation of an alternating current (AC) in a Push-Pull signal of sub-beams in an optical pickup apparatus, wherein the optical pickup apparatus comprises at least two optical systems for different types of optical recording media, one of objective lenses in the optical systems being offset from a central line of the optical recording medium, the method comprising:
   disposing a diffraction grating diffracting light emitted from a light source to form a main beam and a number of sub-beams in the optical system including the offset objective lens, the diffraction grating comprising first and second diffraction regions having different grating patterns arranged alternately on the diffraction grating; and
   positioning a center of each of the sub-beams at a boundary of the first and second diffraction regions on the surface of the diffraction grating.

13. The method of claim 12, wherein the diffraction grating is rotated for the main beam and the sub-beams formed by the diffraction grating to be arranged along a track direction of the optical recording medium.

14. The method of claim 13, wherein a rotational angle of the diffraction grating is determined based on a direction of a track at a middle of the optical recording medium in a radial direction.

15. The method of claim 13, wherein the optical system including the offset objective lens comprises a photodetector unit and an astigmatic lens, both rotated corresponding to a track of the optical recording medium, wherein the photodetector unit measures the amounts of light of the main beam and the sub-beams reflected from the optical recording medium and the astigmatic lens introduces astigmatism into the main beam and the sub-beams incident on the photodetector unit.

16. The method of claim 15, wherein rotational angles of the astigmatic lens and the photodetector unit are determined based on a track position at the middle of the optical recording medium in the radial direction.

17. The method of claim 12, wherein areas of the first and second diffraction regions for each sub-beam is the same on the surface of the diffraction grating.

18. The method of claim 17, wherein the grating patterns of the first and second diffraction regions are inclined in opposite directions.

19. The optical pickup apparatus of claim 1, wherein the apparatus further prevents a generation of an alternating current (AC) in a Push Pull signal of the sub beams.

20. The optical recording/reproducing system of claim 11, wherein the system further prevents a generation of an alternating current (AC) in a Push Pull signal of the sub beams, to thereby allow tracking servo for different types of optical recording media.

* * * * *